Jan. 14, 1958   N. M. DENNIS   2,820,147
GRAIN INSECT TESTER
Filed July 8, 1955
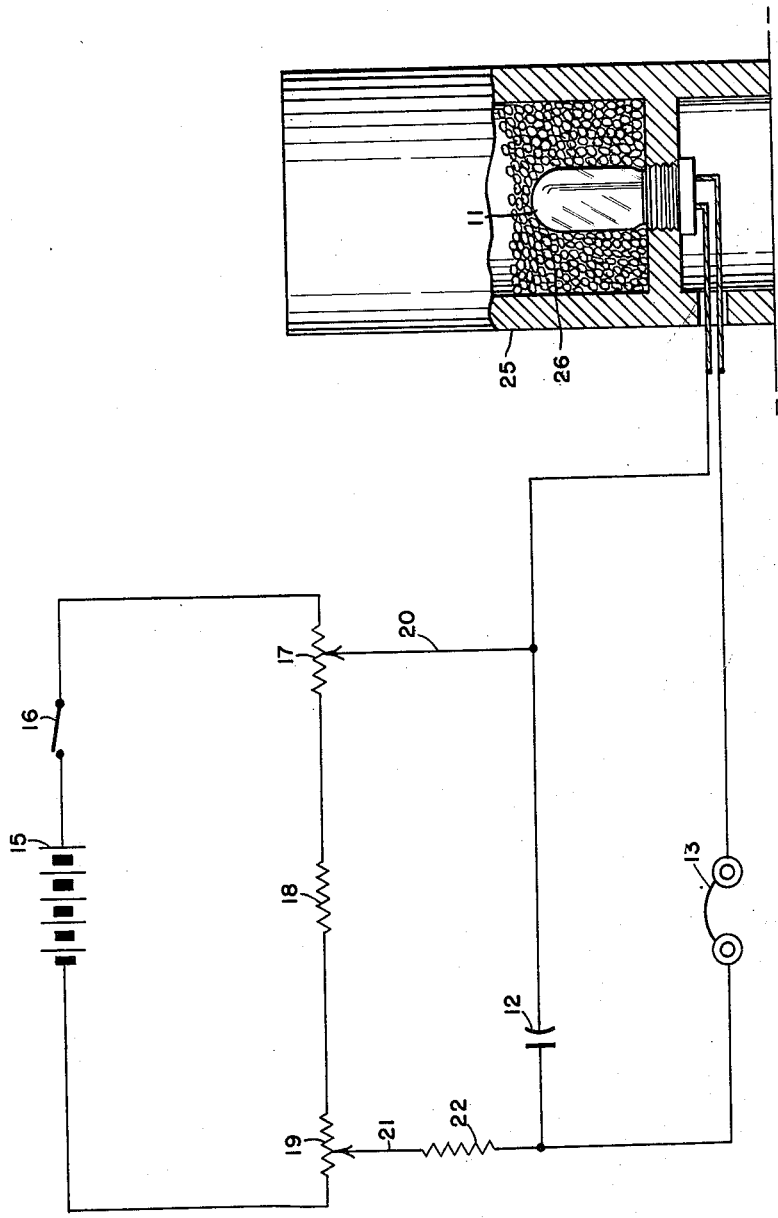
INVENTOR
NORMAN M. DENNIS
BY  J. A. Seegrush
ATTORNEY United States Patent Office 2,820,147
Patented Jan. 14, 1958

2,820,147

GRAIN INSECT TESTER

Norman M. Dennis, Manhattan, Kans.

Application July 8, 1955, Serial No. 520,938

1 Claim. (Cl. 250—83.3)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

The patent rights for the United States in any invention in the patent to be granted on this application are dedicated to the public.

This invention relates to testing of grain, such as wheat, to determine the presence of insects, such as larva or immature weevils, feeding within the kernels. Grain so contaminated should not be used for food.

Infestation of this kind is not easily detectable and it is the object of this invention to provide a simple instrument and method for expeditiously making the test.

In general, according to the invention, the grain to be tested is placed near the tube of a known type gaseous-tube relaxation oscillator. With proper choice of values for various units of the oscillator and its proper adjustment, the instrument will give discharge impulses of low frequency, for example one discharge per several seconds. When so adjusted, the oscillator is very sensitive to infrared radiation. Little addition of infrared striking the ionized gas within the tube produces a marked change in the discharge frequency.

If the grain being tested is infested, the living insects give off infrared radiation thus to change the frequency of the oscillator. This change of frequency serves as the indicator of the presence of insect infestation within the kernels.

Preferably the instrument is provided with a casing surrounding the gaseous tube for receiving grain. In this manner the test sample is positioned near the tube. The casing is preferably made of lead. This blocks off stray outer radiations and prevents them from entering and affecting the tube.

For a description of the invention in greater detail reference is made to the single figure in the accompanying drawing in which the oscillator circuit is shown in diagram and the gaseous tube and the surrounding casing is shown structurally.

As shown in the drawing the oscillator portion of the circuit includes the gaseous tube 11 connected in series with condenser 12, headphones 13 being connected in a series in the circuit to give an audible detection of periodic discharges of the tube. Voltage is supplied to the circuit by the battery 15 connected through switch 16 in series with a broad range potentiometer 17, resistance 18 and a fine adjustment potentiometer 19, the adjusting arm 20 of potentiometer 17 being connected to one plate of the condenser 12 and the adjusting arm 21 of potentiometer 19 being connected through resistance 22 to the other plate of the condenser.

The casing 25, made of lead, surrounds the tube 11. The grain 26 being tested is held in the casing adjacent to the tube.

Although the dimension of parts is subject to variation the following parts list gives satisfactory results:

Gaseous tube 11 _____ Neon light–51.
Condenser 12 _____ 0.05 microfarads.
Battery 15 _____ 67½ volts.
Potentiometer 17 _____ 800,000 ohms.
Resistance 18 _____ 3,000,000 ohms.
Potentiometer 19 _____ 50,000 ohms.
Resistance 22 _____ 100,000 ohms.

Other current indicating devices, such as cathode ray tube or micro-ammeter, may be substituted for the headphones.

In using the instrument it is first calibrated. This is accomplished by placing a sample of non-infected grain in casing 25 and, with potentiometer 17 in a desired fixed position, adjusting potentiometer 19 to give a predetermined frequency of discharge (indicated by clicks in the headphones) such as frequency of one impulse every five seconds. Various samples of grain of known percentage of infestation are then placed in the casing. The frequency of discharge is increased by the presence of the insects. With a sample of known infestation in place, the potentiometer 19 is then adjusted until the frequency is the same as the designated predetermined frequency and the reading of the potentiometer is recorded. From the figures obtained from the several known samples, the calibration chart for the particular type of grain to be tested is formulated.

In making a test, the unknown sample is placed in the casing. Potentiometer 19 is adjusted to obtain the predetermined frequency of discharge and the percentage of infestation is read from the setting of the potentiometer compared to the calibration chart.

I claim:

A method of testing grain to determine the presence of insect infestation within the kernel comprising positioning the grain to be tested near the tube of a gaseous-tube relaxation oscillator thus to change the discharge frequency of the oscillator due to the infrared radiation from the insects, the change in frequency serving as the indicator of the presence of insect infestation within the kernels.

References Cited in the file of this patent

UNITED STATES PATENTS

| | | |
|---|---|---|
| 1,954,204 | Hayes | Apr. 10, 1934 |
| 2,332,154 | Lindsay et al. | Oct. 19, 1943 |
| 2,472,879 | Bayle | June 14, 1949 |